WAVE TRANSLATING SYSTEM

Filed Dec. 27, 1955

CORRECTION OF INDIVIDUAL PUSH-PULL DRIVING VOLTAGES TO PROVIDE OPTIMUM COMBINED MAGNITUDE FOR MAINTAINING OPTIMUM OUTPUT VOLTAGE WITHIN A PARTICULAR FREQUENCY RANGE OF APPLIED SIGNALS.

INVENTOR
S.B. COLEMAN
BY V. P. Priolo

ATTORNEY

United States Patent Office 2,891,117

Patented June 16, 1959

2,891,117

WAVE TRANSLATING SYSTEM

Sidney B. Coleman, Basking Ridge, N.J., assignor to American Telephone and Telegraph Company, a corporation of New York Application December 27, 1955, Serial No. 555,358

2 Claims. (Cl. 179—171)

This invention relates to wave translating systems, and more particularly to push-pull amplifiers.

A general object of the invention is to provide a push-pull amplifier which will convert a relatively small input signal voltage into a relatively large optimum output voltage and will maintain said output voltage at its optimum by minimizing the effect of distortion producing factors.

One feature of this invention is directed to the application of the applied or input signals to each side of the push-pull stage through individual amplifier paths.

Another feature is directed to the use of an even number of inversions in one amplifier path and an odd number of inversions in the other amplifier path to provide signals of opposite phase at the push-pull stage.

A further feature is directed to the application of negative feedback from one side only of the secondary of the output transformer to each side of the amplifier over separate paths.

The above-defined objective is attained through the combination of the individual amplifier and feedback paths by driving one side of the push-pull stage in phase with the other side of the push-pull stage to overcome the influence of distortion producing factors in said other side and maintain the combined magnitude of the push-pull driving voltages substantially constant.

In accordance with the embodiment disclosed herein the same signal is applied to the input of a three-stage amplifier and the input of a two-stage amplifier. The outputs of these amplifiers are applied to a push-pull stage which includes an output transformer. These outputs may be equalized before they are applied to the push-pull stage by means of negative feedback in the three-stage amplifier; feedback being provided by a path connecting the cathode of the third stage with the cathode of the first stage.

Negative feedback is applied from the secondary of the output transformer to each side of the push-pull circuit over separate paths. With this arrangement, which is possible because of the manner in which the necessary phase inversion for driving the push-pull stage is provided, output from the full secondary winding is fed back over separate paths without the use of couplings between windings or parts of windings on the transformer. Assumptions regarding ideal transformer characteristics, which are never actually achieved, are therefore not involved.

The nature of the invention and its distinguishing features and advantages will be more clearly understood from the following detailed description and the accompanying drawing in which.

Figure 1:
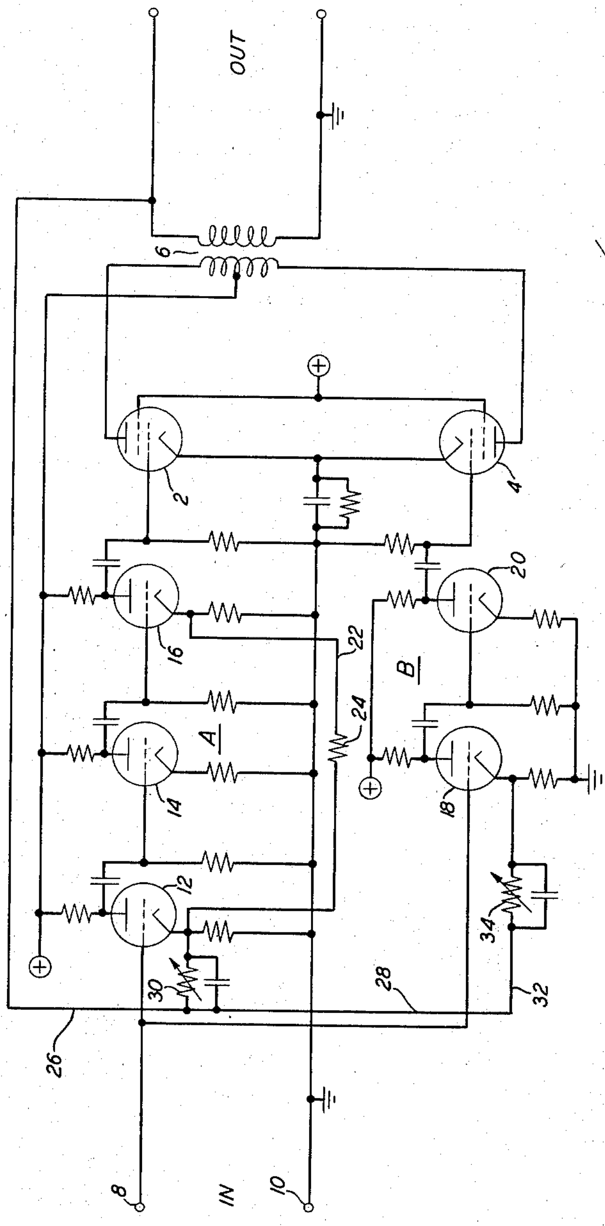
Fig. 1 is a schematic of an embodiment of the invention.

Referring now to the accompanying drawing, tubes 2 and 4 constitute a push-pull stage which is coupled to output transformer 6. The signal to be amplified is applied to terminals 8 and 10 and fed to tube 2 of the push-pull stage through the amplifier A which comprises tubes 12, 14 and 16 and to tube 4 of the push-pull stage through the amplifier B which comprises tubes 18 and 20. It is important to note that amplifiers A and B are independent and that the operation of one does not influence the operation of the other. With an odd number of voltage amplifier stages on one side and an even number on the other, the signals on the grids of tubes 2 and 4 are of opposite phase as required.

Prior to the connection of a load the signal applied to tube 2 may be made equal to that applied to tube 4 by means of the negative feedback path which comprises the cathode resistor of tube 16, conductor 22, resistor 24 and the cathode resistor of tube 12. Additional modifications of the amplification characteristics may be contributed by the unbypassed cathode resistors and the plate load resistors in the several stages.

Over-all negative feedback is provided over the path which comprises conductor 26 and adjustable resistor 30 to the input of amplifier A, and over the path which comprises conductors 26, 28 and 32 and adjustable resistor 34 to the input of amplifier B. Each of these paths is independent of the other and serves to feed back a portion of the same output voltage to each of the amplifiers A and B. With the proper load connected, and at a frequency representative of signals of the highest amplitude expected, resistor 30 and/or resistor 34 may be adjusted to control the amount of feedback and initially establish the optimum condition for minimum distortion of the output voltage.

Figure 2:
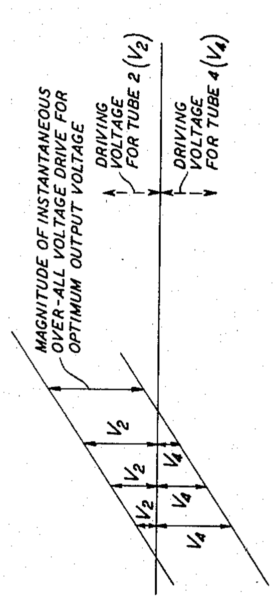
Fig. 2 is a diagram showing the correction of the individual push-pull driving voltages to provide an optimum combined magnitude for optimum output voltage.

The optimum output voltage, or the output voltage in which the influence of distortion producing factors is at a minimum, is determined by the combined magnitude of the individual push-pull driving voltages or the over-all voltage drive. If the optimum magnitude of over-all voltage drive, which will, of course, be different for different frequency ranges of applied signals, is maintained substantially constant, the output voltage will remain at its optimum. As shown in Fig. 2, it is not necessary that the individual push-pull driving voltages be equal in order to maintain the optimum condition for minimum distortion of the output voltage. The optimum condition is determined by the combined magnitude of the driving voltages and is maintained by correcting one or the other of the driving voltages to hold their combined magnitude at the optimum value.

As stated heretofore, in accordance with the present invention one or the other of the driving voltages is corrected by means of the independent amplifiers A and B and the independent over-all negative feedback loops connected thereto.

It is well known that the over-all negative feedback loop connected to amplifier A will reduce the influence of all of the distortion producing factors in amplifier A, and that the over-all negative feedback loop connected to amplifier B will reduce the influence of all of the distortion producing factors in amplifier B. However, while the feedback loop will reduce the influence in its related amplifier it cannot eliminate it completely because the cause of the influence remains in the amplifier.

With the present invention either one of the independent amplifiers A or B is excited to overcome the influence of distortion producing factors in the opposite amplifier and thereby further reduce said influence.

Since amplifiers A and B are independent, the distortion producing factors present in one will not necessarily be present in the other and therefore the voltage change produced by said factors in one will not be matched by a like voltage change in opposite phase in the other. The influence will manifest itself in the output voltage which, by means of the feedback loops, will be impressed upon the amplifier in which the cause of the influence is present, and upon the opposite amplifier. The push-pull grid connected to said opposite amplifier will thus be driven in phase with the push-pull grid connected to the amplifier in which the distortion producing factors are present, to maintain the optimum magnitude of the over-all voltage drive.

The influence of all of the distortion producing factors in one side of the push-pull amplifier is reduced as a result of the inverse excitation of the other side, as well as by negative feedback through the loop on the same side. The term inverse excitation describes the driving of the push-pull grid of one side in phase with the push-pull grid of the other side when any influence causing a voltage change on said other side is not matched by a like voltage change in opposite phase on said one side.

It is to be understood that the above-described arrangements are illustrative of the application of the principles of the invention. Other arrangements may be devised by those skilled in the art without departing from the spirit and scope of the invention.

What is claimed is:

1. A push-pull circuit comprising two independent amplifiers, each of said amplifiers having input and output stages, each of said input stages comprising corresponding first and second control elements, one of said amplifiers providing an odd number of inversions, the other of said amplifiers providing an even number of inversions, a push-pull stage, a source of signals, said first control element of each of said input stages directly connected to said source of signals in such manner that the signals applied thereto are the same and in phase, the output of one of said amplifiers connected to one side of said push-pull stage to provide a first driving voltage, the output of the other of said amplifiers connected to the other side of said push-pull stage to provide a second driving voltage, a negative feedback path comprising first and second parallel branch paths, said first branch path connecting the output of said push-pull stage to said second control element of one of said input stages, said second branch path connecting the output of said push-pull stage to said second control element of the other of said input stages, adjustable impedance means in each of said parallel branch paths for individually controlling the amount of feedback to each of said amplifiers and for establishing the combined magnitude of said first and second driving voltages for minimum distortion of the output of said push-pull stage.

2. A wave translating system comprising two independent amplifiers, each of said amplifiers having input and output stages, each of said input stages comprising corresponding first and second control elements, one of said amplifiers providing an odd number of inversions, the other of said amplifiers providing an even number of inversions, a push-pull stage including an output transformer, said transformer comprising a secondary winding, a source of signals, said first control element of each of said input stages directly connected to said source of signals in such manner that the signals applied thereto are the same and in phase, the output of one of said amplifiers connected to one side of said push-pull stage to provide a first driving voltage, the output of the other of said amplifiers connected to the other side of said push-pull stage to provide a second driving voltage, a negative feedback path comprising first and second parallel branch paths, said first branch path connecting said transformer secondary winding to said second control element of one of said input stages, said second branch path connecting said transformer secondary winding to said second control element of the other of said input stages, means for equalizing the gains of said amplifiers, said means comprising a negative feedback path in one of said amplifiers connecting one stage with a preceding stage, adjustable impedance means in each of said parallel branch paths for individually controlling the amount of feedback to each of said amplifiers and for establishing the combined magnitude of said first and second driving voltages for minimum distortion of the output of said push-pull stage.

References Cited in the file of this patent

UNITED STATES PATENTS

| | | |
|---|---|---|
| Re. 24,204 | Coulter | Aug. 28, 1956 |
| 2,015,082 | Meyers | Sept. 24, 1935 |
| 2,252,612 | Bingley | Aug. 12, 1941 |
| 2,281,618 | Riddle | May 5, 1942 |
| 2,315,312 | Brown | Mar. 30, 1943 |
| 2,529,459 | Pourciau et al. | Nov. 7, 1950 |
| 2,775,657 | Van Zelst | Dec. 25, 1956 |

FOREIGN PATENTS

| | | |
|---|---|---|
| 990,550 | France | Sept. 14, 1951 |

OTHER REFERENCES

Proceedings of the I.R.E., vol. 28, No. 2, February 1940, pages 59–66, P. O. Pedersen, "A Distortion Free Amplifier."